(12) United States Patent
Katayama (10) Patent No.: US 10,882,363 B2
(45) Date of Patent: Jan. 5, 2021

(54) PNEUMATIC TIRE

(71) Applicant: SUMITOMO RUBBER INDUSTRIES, LTD., Hyogo (JP)

(72) Inventor: Koichi Katayama, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 194 days.

(21) Appl. No.: 16/145,943

(22) Filed: Sep. 28, 2018

(65) Prior Publication Data
US 2019/0111738 A1 Apr. 18, 2019

(30) Foreign Application Priority Data

Oct. 13, 2017 (JP) .................................. 2017-199641

(51) Int. Cl.
*B60C 13/02* (2006.01)
*B60C 11/01* (2006.01)

(52) U.S. Cl.
CPC .............. *B60C 13/02* (2013.01); *B60C 11/01* (2013.01); *B60C 2200/14* (2013.01)

(58) Field of Classification Search
CPC . B60C 2011/013; B60C 13/00; B60C 13/001; B60C 13/002; B60C 13/02; B60C 13/023
See application file for complete search history.

(56) References Cited

U.S. PATENT DOCUMENTS

2012/0216930 A1 8/2012 Matsuda

FOREIGN PATENT DOCUMENTS

| JP | 2004-291937 | * 10/2004 |
| JP | 2010-167832 | * 8/2010 |
| JP | 2012-179964 A | 9/2012 |

OTHER PUBLICATIONS

Machine translation of JP 2004-291937, 2004.*
Machine translation of JP 2010-167832, 2010.*

* cited by examiner

*Primary Examiner* — Justin R Fischer
(74) *Attorney, Agent, or Firm* — Greenblum & Bernstein, P.L.C.

(57) ABSTRACT

A pneumatic tire comprises a sidewall portion which is provided in its radially outer part with first protrusions and circumferential ribs. The first protrusions are arranged in the tire circumferential direction at intervals. The circumferential ribs are disposed between and connect between the first protrusions. The first protrusions and the circumferential ribs protrude from the outer surface of the radially outer part, and the protruding amount of the circumferential ribs is less than the protruding amount of the first protrusions. The first protrusions each have side walls protruding from the outer surface and extending in the tire radial direction.

14 Claims, 5 Drawing Sheets

PNEUMATIC TIRE

TECHNICAL FIELD

The present invention relates to a pneumatic tire, more particularly to a pneumatic tire in which a radially outer part of the tire sidewall is provided with patterned protrusions.

BACKGROUND ART

In pneumatic tires mounted on a vehicle for traveling off road such as an SUV or a four-wheel drive vehicle, there is a possibility that the sidewall portions of the tires, especially the radially outer parts thereof are liable to be cut by sharp edges of stones when traveling over rough terrain for example. Further, such vehicle also has the opportunity to travel on soft terrain with muddy ground.

Japanese Patent Application Publication No. 2012-179964 discloses a pneumatic tire, wherein a radially outer part of the sidewall portion is provided with protrusions protruding from the outer surface thereof to increase the cut resistance of the radially outer part. Further, such protrusions increase the traction when traveling on soft terrain with muddy ground by shearing the soil. Thus, the running performance on soft terrain (hereinafter, simply referred to as "mud performance") can be improved.

In order to further improve the cut resistance and the mud performance, it is conceivable to increase the protruding amount of the protrusions. In this case, however, as the protrusions increase the rubber volume of the sidewall portion, there is a possibility that generated heat is accumulated there to increase the temperature of the sidewall rubber, and the durability of the tire is deteriorated.

SUMMARY OF THE INVENTION

It is therefore, an object of the present invention to provide a pneumatic tire in which, by improving the configuration of protrusions, the cut resistance of the sidewall portion and the mud performance of the tire can be improved without sacrificing the durability of the tire.

According to the present invention, a pneumatic tire comprises:

a tread portion with tread edges, and a pair of sidewall portions extending radially inwardly from the respective tread edges, wherein one of, or alternatively, each of the sidewall portions is provided in its radially outer part with first protrusions and circumferential ribs, the first protrusions are arranged in the tire circumferential direction at intervals, the circumferential ribs are disposed between and connect between the circumferentially adjacent first protrusions, the first protrusions and the circumferential ribs protrude from the outer surface of the radially outer part, and the protruding amount of the circumferential ribs is less than the protruding amount of the first protrusions, whereby the first protrusions each have side walls protruding from the above-said outer surface and extending in the tire radial direction.

It is preferable that the circumferential ribs are positioned radially inward of the radially outer ends of the first protrusions.

It is preferable that the circumferential ribs are inclined with respect to the tire circumferential direction.

It is preferable that a plurality of the circumferential ribs are provided between every two of the circumferentially adjacent first protrusions.

It is preferable that second protrusions whose protruding amount is less than that of the circumferential ribs, are disposed between the circumferentially adjacent first protrusions.

It is preferable that the second protrusions extend radially outwardly from the circumferential ribs.

It is preferable that the radial dimension of the second protrusions is smaller than the radial dimension of the first protrusions.

It is preferable that third protrusions whose protruding amount is less than that of the first protrusions, are disposed between the circumferentially adjacent first protrusions.

It is preferable that the third protrusions extend radially outwardly from the circumferential ribs.

It is preferable that the radial dimension of the third protrusions is smaller than the radial dimension of the second protrusions.

It is preferable that the surface area A1 of the first protrusions, the surface area A2 of the second protrusions, and the surface area A3 of the third protrusions satisfy the following relation: $A1>A2>A3$.

It is preferable that the surface area A1 of the first protrusions, the surface area A2 of the second protrusions, and the surface area A3 of the third protrusions satisfy the following relation: $A1:A2:A3=10:(2 \text{ to } 5):(1 \text{ to } 3)$.

It is preferable that the protruding amount h1 of the first protrusions, the protruding amount h2 of the second protrusions, and the protruding amount h3 of the third protrusions satisfy the following relation: $h1>h2>h3$.

It is preferable that the protruding amount h1 is 2 to 10 mm.

Therefore, in the pneumatic tire according to the present invention, the first protrusions increase the thickness and improve the cut resistance, and the sidewalls of the first protrusions increase the shearing force of the soil and improve the traction and mud performance.

The first protrusions are connected by the circumferential ribs and the deformation thereof is suppressed. This helps to improve the cut resistance and the traction. In addition, the circumferential ribs can also prevent cutting damage of a portion between the first protrusions. Furthermore, as the protruding amount of the circumferential ribs is less that that of the first protrusions, the increase in the rubber volume is suppressed, and the deterioration of the durability due to the heat storage is prevented.

Thus, the pneumatic tire according to the present invention can be improved in the cut resistance and the mud performance without sacrificing the durability.

DESCRIPTION OF THE PREFERRED EMBODIMENTS

The present invention can be applied to various pneumatic tires for passenger cars, light trucks, heavy duty vehicles and the like.

Taking a passenger car tire as an example, embodiments of the present invention will be described with reference to the accompanying drawings.

Figure 1:
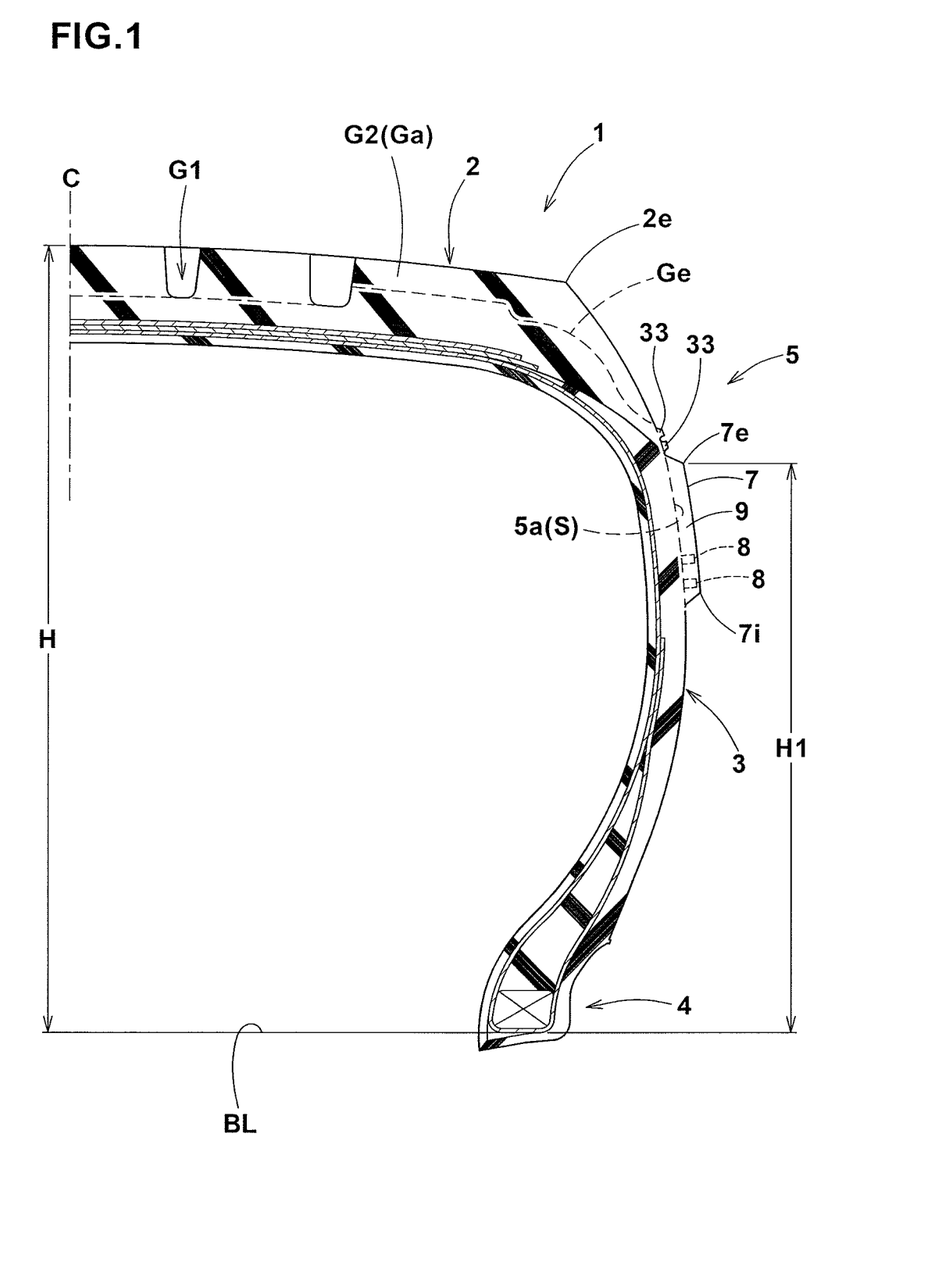
FIG. 1 is a cross-sectional view of a pneumatic tire as an embodiment of the present invention.

FIG. 1 shows a pneumatic tire 1 as an embodiment of present invention under the standard state.

In this embodiment, the tire 1 is a so-called all season tire for a four-wheel-drive (4WD) vehicle such as SUV.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The tread edges are the axial outermost edges of the ground contacting patch of the tire which occurs under a normally inflated loaded condition when the camber angle of the tire is zero.

The normally inflated loaded condition is such that the tire is mounted on the standard wheel rim and inflated to the standard pressure and loaded with the standard tire load.

The tire 1 comprises a tread portion 2 whose radially outer surface defines the tread, a pair of axially spaced bead portions 4 mounted on a wheel rim, a pair of sidewall portions 3 extending between the tread edges 2e and the bead portions, a carcass 6 extending between the bead portions 4 through the tread portion 2 and the sidewall portions 3, and a tread reinforcing belt disposed radially outside the carcass 6 in the tread portion 2.

The carcass 6 is composed of at least one ply (in this embodiment, only one ply) of cords arranged radially, for example, at an angle in a range of from 70 to 90 degrees with respect to the tire equator C, extending between the bead portions 4 through the tread portion 2 and sidewall portions 3 and turned up around the bead core in each bead portion 4 from the axially inside to the axially outside of the tire to form a pair of turnup portions and a main portion therebetween.

In the present embodiment, the tread portion 2 is provided with circumferentially extending longitudinal grooves G1 and axially extending lateral grooves G2.

The lateral grooves G2 include shoulder lateral grooves Ga each extending from the tread edge 2e toward the axially inside. The shoulder lateral grooves Ga also extend from the tread edges 2e toward the axially outside and radially inside, defining a so-called buttress portion in each of the tire shoulders.

Each of the sidewall portions 3 has a radially outer part 5 adjacent to the buttress portion where the shoulder lateral grooves Ga open toward the axially outside.

In the tire meridian section, the outer surface 5a of the radially outer part 5 is deemed to have a smooth curve extending along the carcass 6 in disregard of partially formed concavo-convex portions, (for example, protrusions, ribs and serrations described hereinafter, those for ornamental purposes, those for indicating information, and the like).

Figure 2:
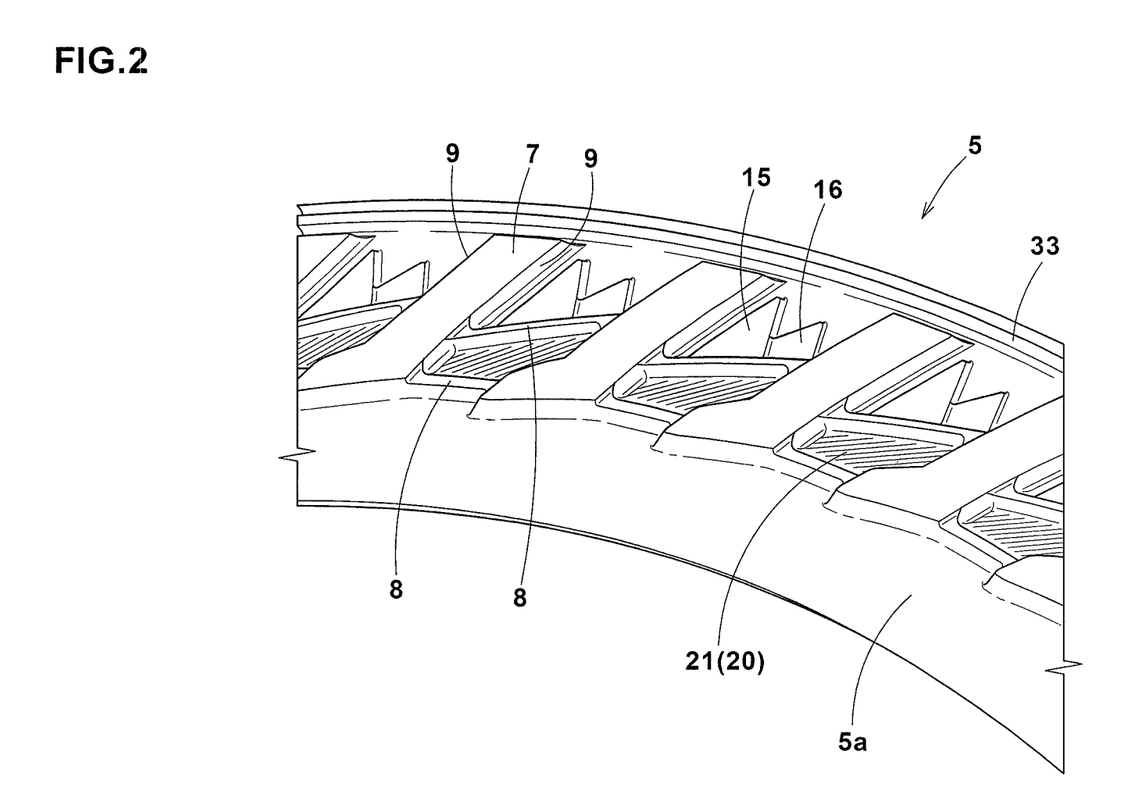
FIG. 2 is a perspective view of the radially outer part of the sidewall portion thereof.
Figure 3:
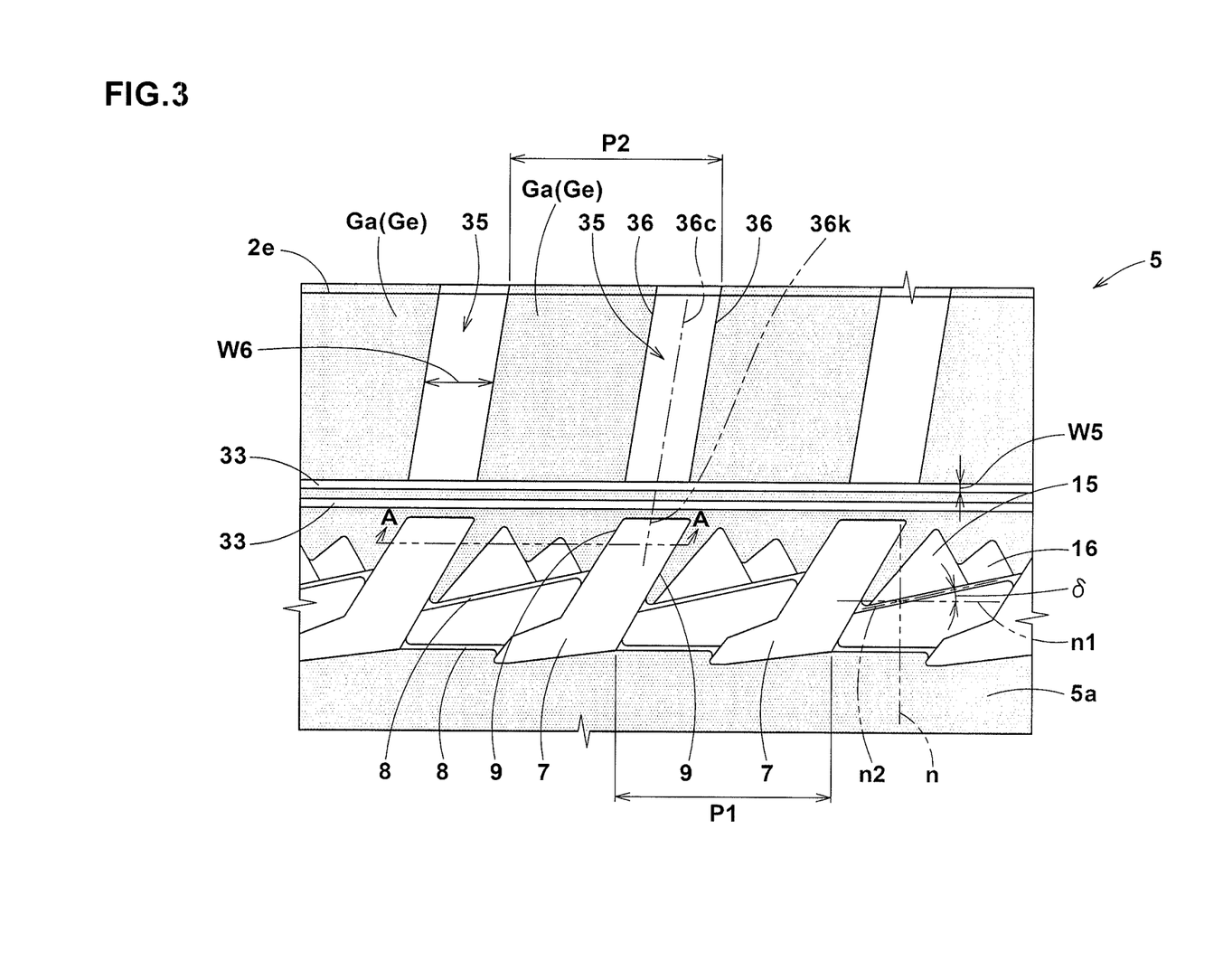
FIG. 3 is a developed partial side view of the pneumatic tire showing the radially outer part of the sidewall portion together with a tire shoulder portion.

In the present embodiment, as shown in FIGS. 2 and 3, the radially outer part 5 of at least one of, preferably each of the sidewall portions 3 is provided with first protrusions 7 and circumferential ribs 8.

The first protrusions 7 and the circumferential ribs 8 protrude from the outer surface 5a of the radially outer part 5.

The first protrusions 7 are arranged in the tire circumferential direction at intervals.

The circumferential ribs 8 are disposed between the first protrusions 7.

The first protrusion 7 has two side walls 9 which protrude from the outer surface 5a and extend in the tire radial direction. The first protrusions 7 can increase the cut resistance of the radially outer part 5. Also the first protrusions 7 can increase the shear of the soil to improve the traction and mud performance.

The circumferential ribs 8 extends in the tire circumferential direction and connect between the circumferentially adjacent first protrusions 7.

Such circumferential ribs 8 suppress the deformation of the first protrusions 7. This helps to improve the cut resistance and the traction by the first protrusions 7. Also, the circumferential ribs 8 can suppress cutting damage in a portion between the first protrusions 7.

Figure 4:
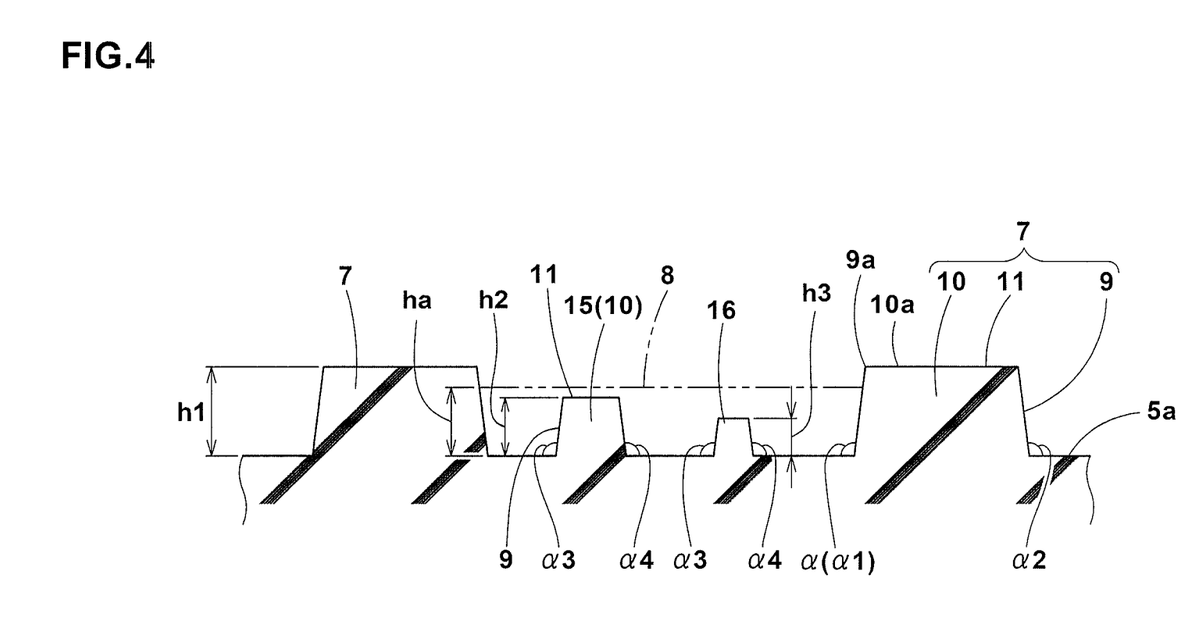
FIG. 4 is an enlarged cross sectional view taken along line A-A of FIG. 3.

The protruding amount ha of the circumferential ribs 8 is set to be smaller than the protruding amount h1 of the first protrusions 7 as shown in FIG. 4.

Such circumferential ribs 8 suppress the increase in the rubber volume of the sidewall portion 3 to prevent deterioration of the durability due to the heat accumulation.

Preferably, the protruding amount ha of the circumferential ribs 8 is set in a range from 75% to 95% of the protruding amount h1 of the first protrusions 7.

If less than 75%, it becomes difficult to increase the cut resistance, and it becomes difficult to reduce the deformation of the first protrusions 7. If more than 95%, there is a possibility that the rubber volume of the radially outer part 5 unfavorably increases.

The first protrusion 7 has the outer surface 11 and two circumferential walls 10 in addition to the two side walls 9. The two side walls 9 are positioned on both sides in the tire circumferential direction of the first protrusion.

The two circumferential walls 10 are positioned on both sides in the tire radial direction of the first protrusion, and extend in the tire circumferential direction, protruding from the outer surface 5a.

The outer surface 11 intersects with the side walls 9 at their outer edges 9a and the circumferential walls 10 at their edged 10a.

The "protruding amount" is a distance from the outer surface 5a to the most protruding position of the wall 9 or 10.

Figure 5:
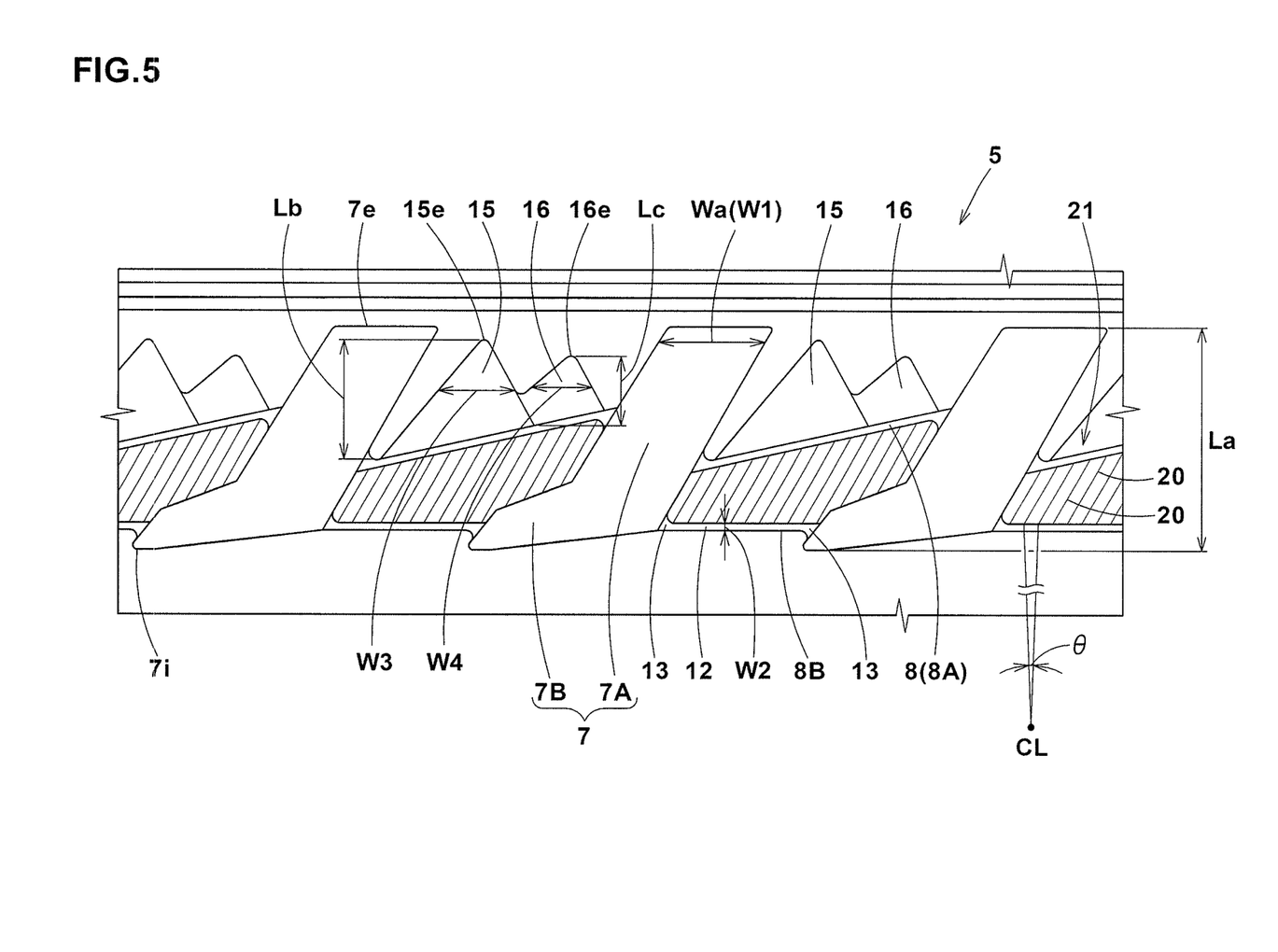
FIG. 5 is a closeup of a portion of FIG. 3.

As shown in FIG. 5, the first protrusion 7 has a portion defined between linearly extending portions of the respective two side walls 9.
The first protrusion 7 in this example is L-shape and composed of a first portion 7A and a second portion 73.
The first portion 7A is defined as extending in the tire radial direction, while keeping the circumferential dimension Wa of the first protrusion 7 constant.
The second portion 73 is defined as extending from the first portion 7A toward the radially inside, while gradually increasing the circumferential dimension Wa.

In general, the rubber thickness of the radially outer part of the sidewall portion is smaller in the radially inner side than the radially outer side, therefore, the rigidity of the radially outer part is lower in the radially inner side than the radially outer side.
Thus, by disposing the second portion 78 on the radially inner side of the first portion 7A, the deformation of the radially outer part 5 can be effectively prevented, and the mud performance is further improved.
The first protrusion 7 is not limited to such a shape. Various shapes, for example, a triangular shape elongated in the tire radial direction, may be employed.

It is not essential, but desirable to set the radial dimension La (maximum) of the first protrusion 7 in a range from 10% to 30% of the tire section height H in order to improve the cut resistance and the mud performance without sacrificing the durability.

As shown in FIG. 1, the radial distance H1 between the radially outer ends 7e of the first protrusions 7 and the base line BL of the bead portions 4 is preferably set in a range from 70% to 90% of the section height H of the tire 1 in order to effectively derive the above-described functions.

As shown in FIG. 5, the circumferential ribs 8 are disposed radially inward of the radially outer ends 7e of the first protrusions 7 in order that the deformation of the first protrusions 7 is effectively suppressed as described above.

In order to reliably exert such effect, it is preferred that the radial distance measured radially inwardly from the radially outer ends 7e to the circumferential ribs 8 is not less than 25% of the radial dimension La of the first protrusions 7.

The circumferential ribs 8 in this example are each inclined with respect to the tire circumferential direction. Such circumferential rib 8 has a component in the tire radial direction, and it is possible to shear the soil to increase the traction.

Between every two of the circumferentially adjacent first protrusions 7, at least one circumferential rib 8, preferably, two or more circumferential ribs 8 are provided. In the present embodiment, two circumferential ribs; a radially outer circumferential rib 8A and a radially inner circumferential rib 8B are provided. As a result, deformation of the first protrusions 7 is further suppressed, and the mud performance is further improved.

The radially outer circumferential rib 8A has many opportunities to contact with the mud and soil in comparison with the radially inner circumferential rib 8B, therefore, in order to effectively serve for the shearing force, the radially outer circumferential rib 8A is inclined at a larger angle than the radially inner circumferential rib 8B with respect to the tire circumferential direction.
On the other hand, as the radially inner circumferential rib 8B extends parallel or nearly parallel with the tire circumferential direction more than the radially outer circumferential rib 8A, the radially inner circumferential rib 8B can suppress deformation of the first protrusions 7 more effectively than the radially outer circumferential rib 8A.

Here, the angle of the circumferential rib 8 (8A, 8B) with respect to the tire circumferential direction means, as shown in FIG. 3, in the side view of the tire, the angle δ at any circumferential position formed between a tangential line n2 to the widthwise center line of the circumferential rib 8 and a tire-circumferential-direction line n1 perpendicular to a tire-radial-direction line (n) passing through the circumferential position concerned.

As shown in FIG. 5, the circumferential rib 8 comprises a pair of end portions 13 having an increased width W2, and a longer main portion 12 therebetween having a constant width W2 smaller than the end portions 13. Such circumferential rib 8 more effectively suppresses the deformation of the first protrusions 7 and exerts the above-mentioned function effectively.

The width W2 in the main portion 12 of the circumferential rib 8 is preferably set in a range of about 5% to 20% of the above-said constant circumferential dimension Wa of the first protrusion 7 in the first portion 7A.
If less than 5%, there is a possibility that the deformation of the first protrusions 7 is unfavorably increased. If more than 20%, there is a possibility that the rubber volume of the radially outer part 5 is unfavorably increased.

In the present embodiment, as shown in FIGS. 2 and 4, the radially outer part 5 is provided between every two of the circumferential adjacent first protrusions 7 with a second protrusion 15 whose protruding amount h2 is smaller than that of the circumferential rib 8, and further, a third protrusion 16 whose protruding amount h3 is smaller than that of the circumferential rib 8.
The second protrusion 15 and the third protrusion 16 can prevent cut damage of the radially outer part 5, while suppressing excessive increase in the rubber volume of the radially outer part 5.
The second protrusion 15 in this example extends radially outwardly from the circumferential rib 8.
Also, the third protrusions 16 in this example extends radially outwardly from the circumferential rib 8.
The second protrusions 15 and third protrusions 16 which come into contact with the soil, generate a large shearing force together with first protrusions 7.
Further, as the second protrusion 15 and the third protrusion 16 are connected to the circumferential rib 8, the deformation of each protrusion 7, 15, 16 can be more effectively suppressed.

As shown in FIG. 5, in this example, the second protrusion 15 is formed in a triangular shape being convex toward the radially outside. Thus, the second protrusion 15 has a portion of which dimension W3 in the tire circumferential direction gradually decreases toward the radially outside. Since one side of the triangular shape is positioned at the circumferential rib 8, the second protrusion 15 has the outer surface 11 and two side walls 9.
The second protrusion 15 is not limited to such a triangular shape. For example, it may be formed in a rectangular shape. In this case, it may have the outer surface 11 and two side walls 9, and a circumferential wall 10.

In this example, the radial dimension Lb (maximum) of the second protrusion 15 is set to be smaller than the radial dimension La of the first protrusions 7 in order to suppress an increase in the rubber volume of the radially outer part 5.
It is not essential but preferable that the radial dimension Lb of the second protrusion 15 is set in a range from 45% to 65% of the radial dimension La of the first protrusions 7.

The radially outer end 15e of the second protrusion 15 is positioned radially inside the radially outer ends 7e of the first protrusions 7. As a result, the above-described function is more effectively exhibited.

As shown in FIG. 5, in this example, the third protrusion 16 is formed in a trapezoidal shape being convex toward the radially outside. Thus, the third protrusion 16 has a portion of which dimension W4 in the tire circumferential direction gradually decreases toward the radially outside. Such third protrusions 16 reduces the rubber volume of a portion of the radially outer part 5 where the third protrusions 16 are formed to increase the rigidity.

In the tire circumferential direction, the second protrusion 15 in this example is separated from the adjacent first protrusions 7. As a result, the heat radiation area is increased and the durability is improved.

As another example, the second protrusion 15 may be continued from the first protrusion 7.

The third protrusion 16 may be formed separately from the second protrusion 15. However, in the third protrusions 16 in this example, one side of the trapezoidal shape (side wall 9) is connected with the second protrusion 15. This suppresses deformation of the protrusions 15 and 16.

Further, the third protrusion 16 may be formed in another shape than the trapezoidal shape, for example, a triangular shape or a rectangular shape.

In this example, the radial dimension Lc (maximum) of the third protrusion 16 is set be smaller than the radial dimension Lb of the second protrusions 15 in order to avoid unfavorable increase in the rubber volume of the radially outer part 5.

It is not essential but preferable that the radial dimension Lc is set in a range from 50% to 70% of the radial dimension Lb of the second protrusion 15.

The radially outer ends 16e of the third protrusions 16 in this example are positioned radially inward of the radially outer ends 15e of the second protrusions 15. As a result, the above-described function is more effectively exhibited.

It is preferable that the surface area A2 of the first protrusion 7, the surface area A2 of the second protrusion 15, and the surface area A3 of the third protrusion 16 satisfy the following magnitude relation (1), A1>A2>A3.
The surface area A1, A2, A3 of each protrusion 7, 15, 16 means the sum of the area of the outer surface 11, the area of the side wall(s) 9, and the area of the circumferential wall(s) 10 if any.
When a protrusion is connected to another protrusion, the area of the connected part (thus not exposed) is double counted in the surface areas of the respective protrusions.

Thus, the first protrusions 7 which have the largest surface area, exert great traction and improve the mud performance. The third protrusions 16 which have the smallest surface area, suppress the heat accumulation and prevent the durability from deteriorating.

In this embodiment, as described above, the main functions expected for the protrusions 7, 15 and 16 are differentiated by making the surface areas of the protrusions 7, 15 and 16 different from each other, therefore, the contradictory problems with cut resistance and mud performance can be solved in a balanced manner.

In order to derive the above effect more effectively, it is preferred that the surface area A1, the surface area A2 and the surface area A3 satisfy the following proportional relation (2), A1:A2:A3=10:(2 to 5):(1 to 3).
The effects by the proportional relation (2) will be described hereinafter.

It is preferable that the protruding amount h1 of the first protrusion 7, the protruding amount h2 of the second protrusion 15, and the protruding amount h3 of the third protrusion 16 satisfy the following magnitude relation (3), h1>h2>h3.

It is more preferable that the protruding amounts h1, h2 and h3 satisfy the following proportional relation (4), h1:h2:h3=1:(0.4 to 0.8):(0.1 to 0.4).

As a result, the protrusions 7, 15 and 16 are provided with the protruding amounts suitable for the respective rubber volumes. Thus, the protrusions 7, 15 and 16 are improved in the effect for suppressing the deformation and the effect for enhancing the traction in good balance.

Preferably, the protruding amount h1 of the first protrusions 7 is set in a range from 2 to 10 mm.

If less than 2 mm, there is a possibility that the mud performance of the tire and the cut resistance of the sidewall portion are deteriorated. Is more than 10 mm, there is a possibility that the sidewall portion 3 is excessively increased in the rubber volume, and the durability is deteriorated by the heat accumulation.

In a cross section taken along the tire circumferential direction as shown in FIG. 4, each of the protrusions 7, 15, 16 is formed in a trapezoidal shape tapered toward its outer surface 11 from the outer surface 5a of the sidewall portion 3. As a result, the rigidity of each protrusions 7, 15, 16 becomes higher on the outer surface 5a side than the outer surface 11 side, so the deformation is further suppressed.

Further, it is preferred that the angle α of each of the side walls 9 of the protrusions 7, 15 and 16 with respect to the outer surface 5a is set to be more than 90 degrees and not more than 150 degrees.

If more than 150 degrees, there is a possibility that the shear force generated by the protrusion decreases, and the mud performance is deteriorated.

In the first protrusion 7 in this example, its opposite two side walls 9 have different angles α (α1 and α2) with respect to the outer surface 5a. As a result, the cross-sectional shape of the first protrusion 7 is asymmetric.

In this example, further, in every two of the circumferentially adjacent first protrusions 7, their side walls 9 confronting each other have the same angle α1 or alternatively α2. As a result, the first protrusions 7 can effectively exert large traction irrespective of the tire rotational directions. Thus, the mud performance can be improved.

From this viewpoint, it is preferred that the difference between the angles α1 and α2 is set in a range from 5 to 15 degrees.

Furthermore, in each of the second protrusion 15 and the third protrusion 16 in this example, its opposite two side walls 9 have different angles α (α3 and α4) with respect to the outer surface 5a. The difference between the angles α3 and α4 is, for example, set in a range from 15 to 25 degrees in order to enhance the above-described function.

The protrusions 7, 15 and 16 are each defined as having a dimension in the tire circumferential direction of 2 mm or more when averaged along a tire radial direction.

As shown in FIG. 5, a region between the radially outer circumferential rib 8A and the radially inner circumferential rib 8B is provided with a serration 21 formed by ridges 20 arranged in the tire circumferential direction.

The ridges 20 has a protruding amount (not shown) of about 0.3 to 0.6 mm when measured from the outer surface 5a, widths (not shown) of about 0.2 to 1.0 mm when measured perpendicular to the respective longitudinal directions, and angular pitches 8 in the tire circumferential direction of about 0.2 to 0.5 degrees around the tire rotation axis CL when measured at the radially inner ends thereof.

such serration 21 increases the surface area and heat radiation, while suppressing a large increase in the rubber volume of the radially outer part 5, and further the cut resistance is improved.

In the present embodiment, as shown in FIGS. 1 to 3, the radially outer part 5 is further provided with at least one, for example, two circumferentially continuous ribs 33 protruding radially outwardly from the outer surface 5a and positioned on the radially outside of the first protrusions 7.

The circumferentially continuous rib 33 can restrain the tire from sinking deep into the mud to improve the mud performance.

In order to effectively derive the above effect, it is preferable that the circumferentially continuous ribs 33 each have a protruding amount (not shown) of from 0.5 to 3.5 mm, and a width W5 in the tire radial direction of from 0.5 to 2.5 mm.

On the radially outside of the circumferentially continuous ribs 33, there are formed buttresses 35, namely protrusions located between the shoulder lateral grooves Ga and protruding axially outwardly from their groove bottoms Ge, defining a so called buttress portion.

As shown in FIG. 1, the shoulder lateral grooves Ga terminate in the vicinity of the radially outermost circumferentially continuous rib 33. Thus, this rib 33 can be regarded as the boundary between the buttress portion and the radially outer part of the sidewall portion in substance.

In the present embodiment, the buttresses 35 or protrusions are disposed at the same circumferential positions as the first protrusions 7 so as to exert a larger shearing force in cooperation with the first protrusions 7, and thereby the mud performance can be improved.

Here, the expression "disposed at the same circumferential positions" means that when the center lines 36c between radially extending edges 36 of the buttresses 35 are radially inwardly extended, the extended imaginary lines 36k respectively intersect the first protrusions 7.

In the side view of the tire, the buttress or protrusion 35 in this example has a parallelogram shape or a rectangular shape extending in the tire radial direction with a constant width W6 in the tire circumferential direction although the shape is not limited to such a shape.

The pitches P2 of the buttresses 35 in the tire circumferential direction is equal to or twice the pitches P1 of the 1st protrusions 7 in the tire circumferential direction.

While detailed description has been made of preferable embodiments of the present invention, the present invention can be embodied in various forms without being limited to the illustrated embodiments.

Comparison Tests

Based on the patterned radially outer part shown in FIG. 2, test tires of size 265/75R17 having the internal structure shown in FIG. 1 were experimentally manufactured and tested for the mad performance, cut resistance and durability as follows.

The specifications of the protrusions of the test tire are shown in Table 1. As to the surface area proportions, the surface areas are indicated by relative values based on the surface area of the first protrusions of the example 1 as being 10.

<Mud Performance Test>
Each test tire was mounted on all wheels of a 2500cc 4WD car, and run on a muddy test course. Then, based on running characteristics relating to the traction, the mud performance was evaluated by the test driver into five ranks. The results are indicated in Table 1, wherein the smaller the rank number, the better the mud performance (the higher the traction).

<Cut Resistance Test>
After the above-mentioned test car traveled over rocky terrain for about 1500 km, cuts caused in the outer surface of the radially outer part of the sidewall portion were measured for their depth and length, and based on their totals, the cut resistance was evaluated into five ranks. The results are indicated in Table 1, wherein the smaller the rank number, the better the cut resistance.

<Durability Test>
using a tire test drum, each test tire was run at a speed of 100 km/h (tire pressure: 350 kPa, tire load: specified maximum load) until thermal damage occurred at the radially outer part, and the running distance was measured. The results are indicated in Table 1, wherein the smaller the rank number, the better the durability (the longer the running distance).

TABLE 1

| Tire | Comparative example 1 | Comparative example 2 | Example 1 | Example 2 | Example 3 | Example 4 | Example 5 | Example 6 |
|---|---|---|---|---|---|---|---|---|
| Protruding amount | | | | | | | | |
| First protrusion h1 (mm) | — | 5 | 5 | 4 | 4 | 5 | 5 | 5 |
| Second protrusion h2 (mm) | — | 3 | 3 | 2 | 4 | 5 | 3 | 3 |
| Third protrusion h3 (mm) | — | 1 | 1 | 0.5 | 2 | 5 | 1 | 1 |
| Circumferential rib ha (mm) | — | 6 | 4 | 3.5 | 3.5 | 4 | 4 | 4 |
| Surface area | | | | | | | | |
| A1:A2:A3 | — | 10:4:3 | 10:4:3 | 10:5:3 | 10:4:3 | 1:1:1 | 10:6:4 | 10:1:0.5 |
| Side wall angle | | | | | | | | |
| α1 (deg.) | — | 120 | 120 | 120 | 120 | 100 | 120 | 120 |
| α2 (deg.) | — | 120 | 120 | 120 | 120 | 100 | 120 | 120 |
| α3 (deg.) | — | 110 | 110 | 110 | 110 | 100 | 110 | 110 |
| α4 (deg.) | — | 100 | 100 | 100 | 100 | 100 | 100 | 100 |
| mud performance | 5 | 3 | 1 | 2 | 2 | 3 | 3 | 3 |
| cut resistance | 5 | 2 | 1 | 2 | 1 | 1 | 1 | 2 |
| durability | 2 | 4 | 3 | 2 | 3 | 3 | 3 | 2 |
| total | 12 | 9 | 5 | 6 | 6 | 7 | 7 | 7 |

From the test results, it was confirmed that the tires according to the present invention can be improved in the cut resistance and mud performance, without sacrificing the durability.

DESCRIPTION OF THE REFERENCE SIGNS 1 pneumatic tire
2 tread portion
3 sidewall portion
5 radially outer part of sidewall portion 3
5a outer surface of radially outer part 5
7 first protrusion
8 circumferential rib
9 side wall

The invention claimed is:

1. A pneumatic tire comprising:
a tread portion with tread edges, and
a pair of sidewall portions extending radially inwardly from the respective tread edges, wherein
one of or alternatively each of the sidewall portions is provided in a radially outer part thereof with first protrusions and circumferential ribs,
the first protrusions are arranged in a tire circumferential direction at intervals,
the circumferential ribs are disposed between and connect between the circumferentially adjacent first protrusions,
the first protrusions and the circumferential ribs protrude from an outer surface of the radially outer part, and a protruding amount of the circumferential ribs is less than a protruding amount of the first protrusions, whereby the first protrusions each have side walls protruding from the above-said outer surface and extending in a tire radial direction, wherein
second protrusions whose protruding amount is less than that of the circumferential ribs, are disposed between the circumferentially adjacent first protrusions, and wherein
the second protrusions extend radially outwardly from the circumferential ribs.

2. The pneumatic tire according to claim 1, wherein the circumferential ribs are positioned radially inward of radially outer ends of the first protrusions.

3. The pneumatic tire according to claim 2, wherein the circumferential ribs are inclined with respect to the tire circumferential direction.

4. The pneumatic tire according to claim 1, wherein the circumferential ribs are inclined with respect to the tire circumferential direction.

5. The pneumatic tire according to claim 1, wherein a plurality of the circumferential ribs are provided between every two of the circumferentially adjacent first protrusions.

6. The pneumatic tire according to claim 1, wherein a radial dimension of the second protrusions is smaller than a radial dimension of the first protrusions.

7. The pneumatic tire according to claim 6, wherein third protrusions whose protruding amount is less than that of the first protrusions, are disposed between the circumferentially adjacent first protrusions.

8. The pneumatic tire according to claim 1, wherein third protrusions whose protruding amount is less than that of the first protrusions, are disposed between the circumferentially adjacent first protrusions.

9. A pneumatic tire comprising:
a tread portion with tread edges, and
a pair of sidewall portions extending radially inwardly from the respective tread edges, wherein
one of or alternatively each of the sidewall portions is provided in a radially outer part thereof with first protrusions and circumferential ribs,
the first protrusions are arranged in a tire circumferential direction at intervals,
the circumferential ribs are disposed between and connect between the circumferentially adjacent first protrusions,
the first protrusions and the circumferential ribs protrude from an outer surface of the radially outer part, and a protruding amount of the circumferential ribs is less than a protruding amount of the first protrusions, whereby the first protrusions each have side walls protruding from the above-said outer surface and extending in a tire radial direction, wherein
second protrusions whose protruding amount is less than that of the circumferential ribs, are disposed between the circumferentially adjacent first protrusions, and
third protrusions whose protruding amount is less than that of the first protrusions, are disposed between the circumferentially adjacent first protrusions, and wherein
the third protrusions extend radially outwardly from the circumferential ribs.

10. The pneumatic tire according to claim 9, wherein a radial dimension of the third protrusions is smaller than a radial dimension of the second protrusions.

11. The pneumatic tire according to claim 9, wherein a surface area A1 of the first protrusions, a surface area A2 of the second protrusions, and a surface area A3 of the third protrusions satisfy the following relation: A1>A2>A3.

12. The pneumatic tire according to claim 11, wherein the surface area A1 of the first protrusions, the surface area A2 of the second protrusions, and the surface area A3 of the third protrusions satisfy the following relation: A1:A2:A3=10:(2 to 5):(1 to 3).

13. The pneumatic tire according to claim 12, wherein the protruding amount h1 of the first protrusions, the protruding amount h2 of the second protrusions, and the protruding amount h3 of the third protrusions satisfy the following relation: h1>h2>h3.

14. The pneumatic tire according to claim 13, wherein the protruding amount h1 of the first protrusions is 2 to 10 mm.

* * * * *